United States Patent [19]
Veil et al.

[11] Patent Number: 5,564,872
[45] Date of Patent: Oct. 15, 1996

[54] IMPLEMENT FOR MACHINE TOOLS AND PROCESS FOR GENERATING ELECTRIC POWER IN ONE SUCH IMPLEMENT

[76] Inventors: Wilfried Veil, Ludwig Uhland Str. 3, D-88213 Ravensburg; Wolfgang Madlener, Königsberger Str. 20, D-88212 Ravensburg, both of Germany

[21] Appl. No.: 399,635

[22] Filed: Mar. 7, 1995

[30] Foreign Application Priority Data

Mar. 21, 1994 [CH] Switzerland ................. 836/94

[51] Int. Cl.$^6$ .............. B23C 9/00; B23B 51/00; G01B 7/02
[52] U.S. Cl. ................ 409/234; 33/561; 408/238; 409/144; 409/230
[58] Field of Search ................. 29/56.5; 409/231, 409/232, 230, 234, 144; 408/147, 238, 239 R; 33/561

[56] References Cited

U.S. PATENT DOCUMENTS 4,716,657  1/1988  Collingwood ................. 408/147

FOREIGN PATENT DOCUMENTS 0337671  10/1989  European Pat. Off. .
222848  9/1989  Japan ................................. 29/56.5

Primary Examiner—William R. Briggs
Attorney, Agent, or Firm—Shoemaker & Mattare, Ltd.

[57] ABSTRACT

Mechanical energy is supplied to an implement on a rotating spindle, and a generator on the implement converts the mechanical energy into electric power. Preferably the energy is supplied in the form of rotary motion via the work spindle. Alternatively, a fluent medium, for example, coolant or compressed air, can be supplied, in which case the medium is used to drive a turbine wheel coupled to the generator.

9 Claims, 5 Drawing Sheets

IMPLEMENT FOR MACHINE TOOLS AND PROCESS FOR GENERATING ELECTRIC POWER IN ONE SUCH IMPLEMENT

BACKGROUND OF THE INVENTION

The invention relates to a process for generating electric power in an implement inserted into the work spindle of a machine tool, as well as an implement for executing the process.

Implements which consume electric power and which are inserted into the work spindle of a machine tool are known. They can be for example measuring heads. Often, probes are used which require electric power to supply the measuring means or for wireless data transmission. Other devices, such as means for remote measurement by means of ultrasound or optical devices, for example, video cameras, can be used in an implement of this type. Another group of electrical consumers are electric drives located in the implement. They can be, for example, the electric drive of a transverse saddle for boring tools or the spindle drive of an angular drilling machine which is inserted as an implement into the work spindle of a machine tool.

Such implements are inserted instead of a conventional tool into the work spindle of a machine tool. Work is often performed during a preprogrammed and largely automatic production process. Also the implement is often inserted into the work spindle by an automatic tool changer. This precludes an electrical connection of the implement since no electrical connections can be established by the tool changer. An electrical line would have to be plugged into the work spindle by hand after inserting the implement; this would hinder automatic operation. However the implement still requires electric power, whether for taking a measurement, for data communications or for another purpose. Since connection of electrical lines to an implement is complicated for the aforementioned reason, measurement data or other information are also preferably transmitted wirelessly to the machine control. The transmitters and receivers necessary for this purpose consume electric power; high power infrared light transmitters have particularly high power consumption.

One main problem is therefore supply of electric power to the implement. The possibility of using an inductive transformer is already known. In this case a coil located in the implement is inductively coupled to a second coil located in the work spindle of the machine tool. However only smaller power values can be transmitted this way, due to poor magnetic coupling. Another disadvantage of this embodiment is the necessary modification of the work spindle.

Another popular possibility is to use a battery built into the implement. Generally a chargeable battery is used. But this solution is not satisfactory either: batteries lead to frequent maintenance on the implement since they must be changed from time to time. This also applies to batteries which have only a limited service life. Moreover they must be periodically recharged; this requires additional expense. If the implement is not being used, it must be connected to a charging station. Therefore it cannot be placed just anywhere in a tool changer. An implement in the form of a measuring head with built-in battery is known for example from EP-337 671.

Therefore one problem of the invention is to avoid the disadvantages of what is known and to devise a largely maintenance-free electric power source for an implement of the aforementioned type which is insensitive to dirt and enables at low cost comparatively high electric power to be made available. This problem is solved by the invention described below.

SUMMARY OF THE INVENTION

The implement which is inserted into the work spindle of a machine tool can be supplied with power by mechanical driving means. Power is preferably transmitted to the implement by the driving means performing mechanical work on the implement, generally on the drive side of the generator. Particularly suitable are driving means of the solid, liquid or gaseous type, which to transmit power are in active contact with the implement. The electric power produced by the generator is then used to supply the electric consumer. Examples of this electric consumer were mentioned above. Frequently used implements are, for example, measuring heads which are equipped with an integrated sending and receiving means for wireless data transmission. These transmitters and receivers based on radio-infrared light or ultrasound technology require electric power.

One simple structure arises in using a form of power which is available in the area of the work spindle of commercial machine tools. This can be, for example, the rotary drive of the work spindle itself, but flowing media such as compressed air or cooling water are also available in the area of the work spindle, and can be easily supplied to the implement to drive a generator. Since the implement is attached to the work spindle, handling is especially simple if the energy can also be supplied via the work spindle. For example, the rotary drive of the work spindle can be used to transmit power. But also compressed air and/or coolant can be supplied in modern machine tools via the work spindle. This takes place via a feed line which is integrated into the work spindle and which is used in metal working in combination with hollow tools to deliver coolant as directly as possible to the tool blades. Internal compressed air feed is used for the same purpose to blow out the tool. Other flowing liquids, such as for example hydraulic fluid, could also be supplied via the work spindle.

The generator located in the housing of the implement is an electromechanical converter which converts the supplied energy into electric power. Preferably, a generator is used which converts rotational energy into electric power. This type of generator is often used in technology: it consists of a stator and a rotor. There are various possibilities for the specific construction of the generator. As a rule, the stator forms the external part of the generator and the rotor is pivotally mounted in the stator. For example, a commercial DC motor can be used as a generator. The stator of the generator is permanently connected to the housing. In order to drive the generator, there are means in addition which allow the supplied energy to be converted into rotary motion between the rotor and stator. These means can, depending on the type of power used, be completely different.

The supplied energy can be stored if the rotor of the generator has a flywheel mass. Alternatively, it can also be coupled to a flywheel mass pivotally mounted on the housing. If the supply of energy is released within a short time, the rotor can continue to spin. It thereby extracts the kinetic energy from the flywheel mass serving as storage.

Conversion of the supplied energy into rotary motion between the rotor and stator is especially simple if the rotary drive of the work spindle is used for power supply. Thus it is rotational energy which acts directly on the coupling element and thus on the housing of the implement. The flywheel mass is thus arranged in the housing such that its axis of rotation axis roughly coincides with the coupling axis which corresponds to the axis of the rotary drive. In this configuration, rotational acceleration acting on the coupling element leads to rotational acceleration of the flywheel mass relative to the housing. This leads to rotary motion of the flywheel mass relative to the housing and thus to rotary motion between the rotor and stator of the generator.

If, for example, the implement is accelerated to maximum rpm, then electric power can be extracted from the generator. The flywheel mass is thereby accelerated, its rpm approach the rpm of the work spindle. Only when the flywheel mass has reached the rpm of the housing is its energy potential exhausted and the generator no longer delivers energy. The same process in reverse is likewise possible by braking the housing of the implement by the work spindle from maximum rpm and bringing it to a standstill. Also in this case the flywheel mass experiences a kinetic energy potential relative to the housing. If at this point electrical current is extracted from the generator, the flywheel mass is thereby braked. The energy potential is exhausted as soon as the flywheel mass comes to rest.

Since most implements, especially the probes which are frequently used, can be inserted only when the implement is at rest, it is primarily the second of these cases which is of interest. It can be used even more efficiently when the flywheel mass is connected to the housing via a overrunning clutch. By means of the overrunning clutch the flywheel mass is coupled to the housing in one direction of rotation and by accelerating the implement in this direction the flywheel mass can therefore be brought synchronously with the housing to maximum rpm. Then the implement is again brought to rest, however the flywheel mass continues to run and its kinetic energy can now be converted by the generator into electric power energy.

One alternative possibility is to supply energy by a flowing medium. Compressed air or coolant have already been mentioned as preferred examples. This version has the special advantage that high electrical power can be made available to the implement at comparatively low cost.

For driving the generator the implement in this case has a fluid drive which is dynamically connected to the generator. Here a generator with a rotor and stator is preferably used, the fluid drive being coupled to the generator rotor. The fluid drive can transform the energy of the flowing medium into rotary motion of the rotor. Especially simple handling of the implement is possible when it is supplied with flowing medium by a feed line located in the work spindle. For this purpose the housing of the implement has at least one inlet opening in the area of the coupling element. This opening can be connected by inserting the implement into the work spindle to a feed line located therein. Especially compressed air or coolant of the machine tool is preferably used as the flowing medium. These media are available in most machine tools so that no additional expense is necessary to make available a flowing medium.

For example, a turbine wheel can be used as the fluid drive. The turbine wheel is the classical fluid drive for generating rotary motion. Therefore preferably it is combined with a generator which has a rotor and a stator. The turbine wheel is thus dynamically connected to the rotor.

The fluid drive can be arranged in diverse ways on the implement. In particular it can be located both inside and also outside of the housing. Placement outside the housing can offer advantages especially when the flowing medium is not supplied via the work spindle, but for example from the outside via conventional compressed air hoses. When coolant is used the arrangement within the housing is advantageous in that the outflow of coolant can be better monitored. If the fluid drive is located in the housing, the latter has at least one inlet opening for the feed of a flowing medium, and at least one outlet opening for drainage of the flowing medium. This outlet opening is advantageously configured such that it is pointed toward the coupling side of the implement so that the flowing medium emerges from the housing in this direction. Generally the inlet opening is connected by a flow space of the housing to the outlet opening. The fluid drive is thus located in the area of the flow space.

The function of the generator is influenced by the intensity of the flow. To be able to adapt the implement to different flow sources, in the inlet opening and/or in the outlet opening is an adjustable nozzle. Using this nozzle the flow cross section available for the flowing medium can be adjusted. Preferably nozzles are used with a control element which is accessible from the outside so that adjustment during operation is possible. If the use of adjustable nozzles on the implement is abandoned, the flow strength can also be adjusted on the flow source used. To optimally set the flow, the operating data of the generator to be optimized must be known. Generally it is the generator voltage which is to reach a desired value. Optimum flow setting is therefore facilitated when on the outside wall of the housing is at least one optical display element for displaying the operating data of the generator. Another improvement is achieved with a flow controller which is integrated into the implement and which monitors the generator voltage and activates a flow valve as soon as it deviates from a set point.

To increase the rotor rpm of the generator a multiplication gear can be connected to it on its input side. High multiplication ratios are achieved primarily with so-called planetary gears.

Especially stable power supply of the implement is achieved when it has a battery which is connected to the consumer and which can be charged by the generator for buffering the power supply. By means of this buffering or storage on the electrical side electric power is also available when the generator is not working. Therefore energy need not necessarily be supplied to the implement while it is being used. If it is for example a measuring device, power supply can be abandoned during the measurement process. Machine down times, as occur when the work is being changed, can be used to charge the battery. Vibrations of the implement caused by energy supply can thus be avoided during implement use. A measuring device for example obtains the electric power needed during the measurement from the battery and the battery is recharged after the measurement is taken by supplying energy.

Implements of the described type are preferably built to be as compact as possible. Therefore every effort is made to accommodate the generator in as small as space as possible. When a shaft-like coupling element is used it is possible to accommodate the generator in the shaft. To do this a hollow coupling shaft is used in which the generator is attached vertically with its rotor axis parallel to the coupling axis. Alternatively a turbine wheel can also be advantageously housed in the coupling shaft. This is especially advantageous when the necessary flowing medium is supplied via the work spindle and is transferred to the implement in the area of the coupling shaft.

DESCRIPTION OF THE PREFERRED EMBODIMENT(S)

Figure 1:
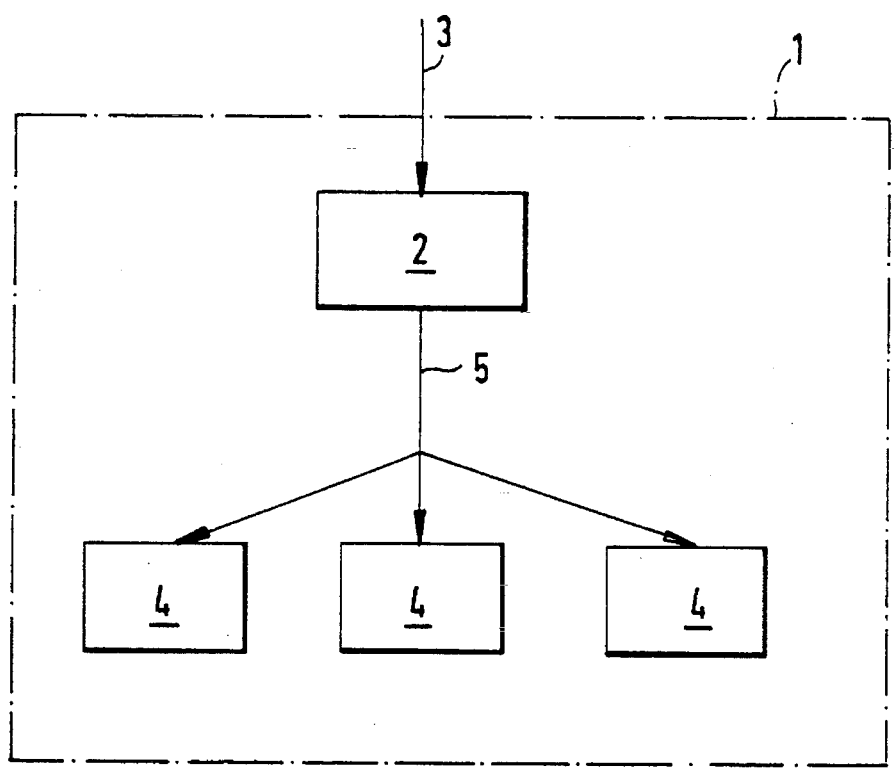
FIG. 1 shows the block diagram of an implement with one generator and several electrical consumers.

FIG. 1 shows the block diagram of an implement with one generator and several electrical consumers. The electrical consumers can be, for example, a measurement means or other sensors, an electrical motion drive, optical display elements or also a sending and receiving means which is needed for communications with the machine tool. They can also be, however, other electrical consumers; what is important is simply that electric power is needed in the implement. It can be for example kinetic energy or mechanical work which is transmitted by driving means, for example, a mechanical coupling or a liquid or gaseous medium, to the implement and is supplied to the drive side of the generator. In implement 1 is generator 2 which converts supplied energy 3 into electric power 5. The latter is then supplied to electrical consumers 4.

Figure 2:
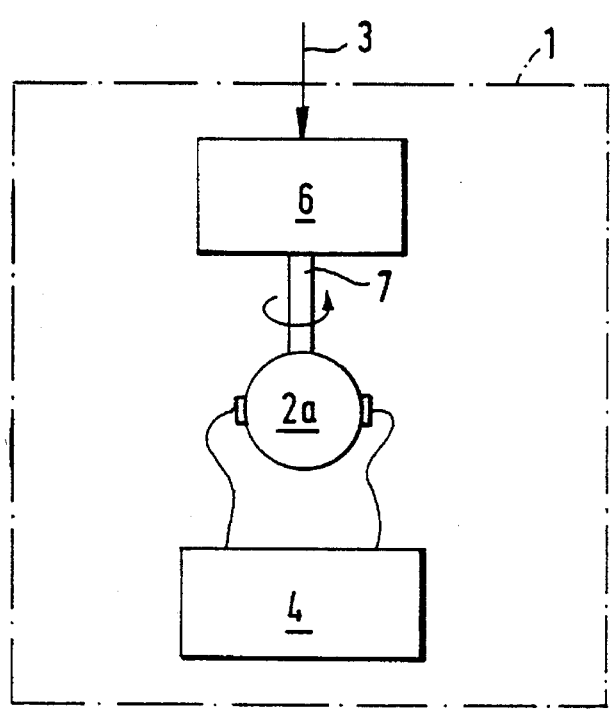
FIG. 2 shows the block diagram of an implement with a generator with rotor and stator, and with means for converting the supplied energy into rotary motion.

FIG. 2 shows the block diagram of an implement which has a generator with a rotor and a stator, as well as means for converting energy into rotary motion. A generator with a rotor and a stator is preferably used to convert the supplied energy into electric power. Depending on the type of supplied energy 3 (for example, rotational energy or mechanical work) additional means 6 are necessary to convert this energy 3 into rotary motion and to transmit the latter to generator 2a via dynamic connection 7. This generator converts the rotary motion into electric power which is supplied to electrical consumers 4.

Figure 3:
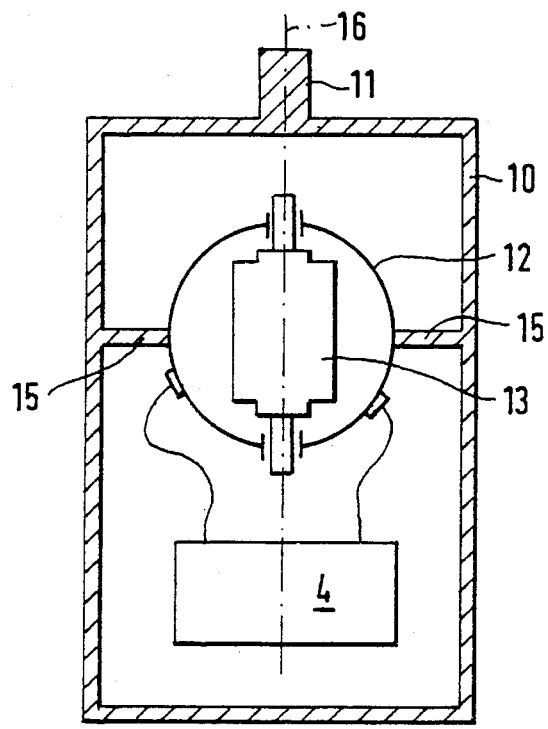
FIG. 3 shows a schematic of an implement with generator to which energy can be supplied by rotational acceleration of the housing.

FIG. 3 shows the schematic of an implement with a generator to which energy can be supplied by the rotational acceleration of the housing. Housing 10 has coupling element 11 for connecting the implement to the work spindle. The implement can thus turn around coupling axis 16 by means of the rotary drive of the work spindle. Therefore rotational acceleration can be transmitted to coupling element 11 and thus to housing 10 of the implement by the work spindle. In housing 10 is a generator with rotor 13 and stator 12. In this case stator 12 is connected permanently to housing 10 via crosspieces 15. Rotor 13 is pivotally mounted in stator 12 and the generator is located in the housing such that the axis of the rotor coincides with coupling axis 16. To generate electric power rotary motion of the rotor relative to the stator is necessary. This rotational movement is achieved when the housing experiences rotational acceleration by the work spindle which is not shown. This acceleration however is not transmitted to the pivotally mounted rotor, it dies and rotational motion of rotor 13 relative to stator 12 results therefrom. Thus, housing 10 can be accelerated to a certain maximum rpm while rotor 13 of the generator remains at rest. Only when electric power is obtained from the generator by electrical consumers 4 does this lead to acceleration of rotor 13. The available energy potential is exhausted as soon as the rotor has reached the rotational speed of the housing; this means that there is no longer any relative motion between the rotor and stator. In this case the greater the moment of inertia of the rotor, the greater is also its energy content. To obtain as much electric power as possible, a rotor with a large moment of inertia is therefore preferably used. The same effect is achieved when rotor 13 is coupled to an additional flywheel not shown here.

When the energy available by means of the above described acceleration process is exhausted, housing 10 and rotor 13 rotate with the same speed in the same direction. If at this point the work spindle of the machine tool is stopped, this likewise means relative motion of housing 10, this time in the reverse direction of rotation. Rotor 13 is not influenced by the braking of the spindle and it maintains its speed. Thus in turn a speed difference arises between the stator and motor which enables generation of electric power. Since housing 10 is no longer turning, measurements can be easily taken even with contact measuring instruments and the electric power necessary for this purpose is delivered by the generator. To use the electric power which can be generated during acceleration of the housing as well, on the electrical side in addition a battery can be provided for its storage.

Figure 4:
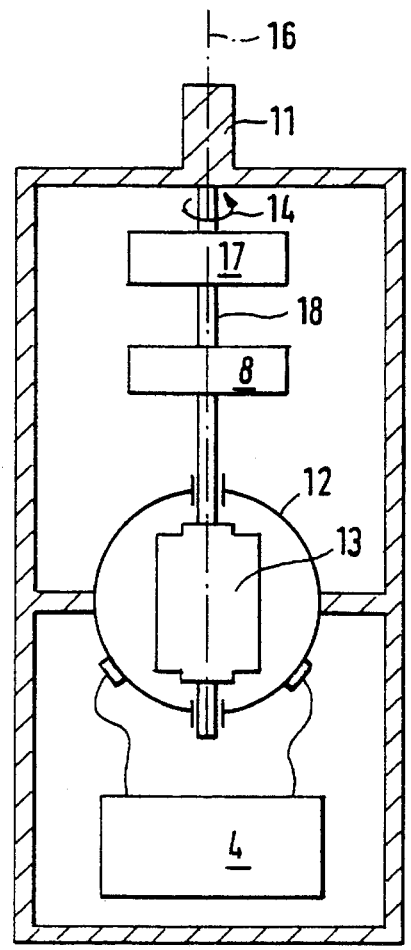
FIG. 4 shows a schematic of an implement according to FIG. 3 in which the rotor is additionally coupled by a overrunning clutch to the housing.

FIG. 4 shows the schematic of an implement according to FIG. 3 in which the rotor is also coupled by a overrunning clutch to the housing. Overrunning clutch 17 is a device which allows transmission of a torque in one direction of rotation 14 from housing 10 to shaft 18. Shaft 18 is connected via an additional flywheel mass 8 to rotor 13. As a result of overrunning clutch 17 it is possible here to accelerate rotor 13 of the generator synchronously with housing 10 if this acceleration takes place in direction of rotation 14. Compared to the arrangement described in FIG. 3 this has the advantage that the time during which the implement rotates can be minimized. The implement is accelerated in direction of rotation 14 to maximum rpm and as the result of overrunning clutch 17 at this point rotor 13 also rotates with the same speed. The work spindle of the machine tool can now be immediately stopped again so that the implement stops and measurements can be taken. Rotor 13 of the generator is not braked in doing so since overrunning clutch 17 in the direction opposite direction of rotation 14 cannot transmit any torque. The generator delivers the energy required by consumer 4 as the result of the kinetic energy.

Figure 5:
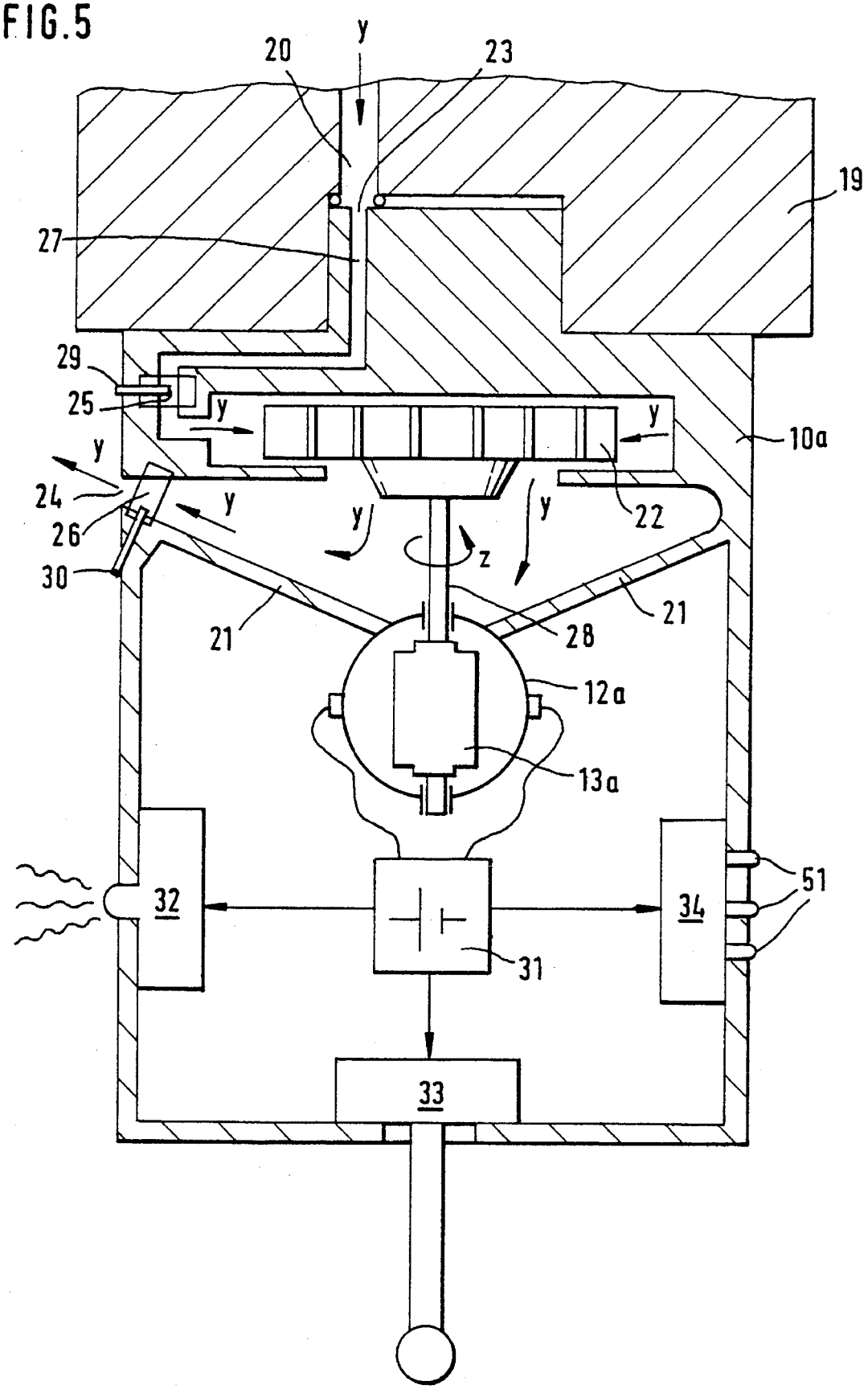
FIG. 5 shows a schematic of an implement inserted into the work spindle of a machine tool, with a fluid drive.

FIG. 5 shows a schematic of an implement inserted into work spindle 19 of a machine tool, with a fluid drive. The implement shown here is a measuring head with a probe as are frequently used in machine tools. Work spindle 19 has feed line 20 which is normally used to deliver coolant to a tool inserted into the spindle. This coolant feed is used here to transmit power to the implement. The latter has inlet opening 23 which is connected to line 20. From inlet opening 23 inlet channel 27 leads to turbine wheel 22 pivotally mounted in housing 10a. The flow direction of the coolant is labelled with arrows Y. It passes turbine wheel 22 and then emerges again from the housing through outlet opening 24. Outlet opening 24 is pointed towards the coupling side of the implement so that the coolant likewise emerges from the housing in this direction. This results in the emerging coolant remaining away from measuring means 33 opposite the coupling element. The measurement is therefore not adversely affected by the coolant. Turbine wheel 22 is coupled to rotor 13a of a generator via a shaft. Stator 12a of the generator is permanently connected to intermediate wall 21 of the housing. Intermediate wall 21 is used at the same time to delineate the upper housing part through which coolant flows from a lower housing part which contains measuring means 33, infrared transmitter and receiver 32, and optical display element 34. Flow Y causes torque on turbine wheel 22; this leads to rotation of shaft 28 in direction of rotation z. Turbine wheel 22 shown here is a fully pressurized overpressure turbine in which the supplied coolant flows radially from the outside in and leaves the turbine in the axial direction. However other forms of turbines can be used; in particular the free jet turbine known in hydroelectric plants as the Pelton turbine is also suitable for use in an implement. Moreover, instead of turbine wheels, other devices are also conceivable which likewise allow conversion of flow energy into rotational energy. It could be for example a chain drive, the rotor carrying a chain wheel over which a endless chain runs which is driven by the flowing medium.

To store electric power there is battery 31 in housing 10a. The battery is charged by the generator and supplies electrical consumers 32, 33 and 34 with electrical power. The supply of electricity can therefore be maintained for a certain time even if coolant feed is interrupted or shut off.

To set optimum flow conditions, in the inlet opening is inlet nozzle 25 and in outlet opening is outlet nozzle 26. The passage cross section of the two nozzles can be changed from the outside via control elements 29, 30. The settings are dependent on the flow medium used and its pressure, as well as on the desired turbine rpm or the desired generator voltage and on the required electrical power. For optimum setting of nozzles 29, 30 therefore it must be detectable from the outside whether the generator voltage corresponds to the desired set point or whether it is above or below this set point. For this reason optical status display 34 with three light emitting diodes 51 visible from the outside is provided. The generator voltage is compared to a set point in a device which is not shown and the result of this comparison is displayed by optical status display 34. If the middle of the three light emitting diodes lights up, this means that the generator voltage corresponds to the desired set point. The other two light emitting diodes indicate an overly high or overly low generator voltage. The flow can be optimally set using nozzles 29, 30 with the aid of this display. Instead of nozzles 29, 30 however a control element provided in feed line 20 of the machine tool can be used for setting the flow.

The implement shown here can be further improved if machine tools are used with work spindles which have a discharge line not shown here, in addition to feed line 20. In this case the flowing medium can be discharged via the work spindle so that the emergence of the flowing medium cannot cause any disruptions.

In this example coolant water was mentioned as a possible flowing medium. However, another liquid, for example a hydraulic fluid which can be supplied by the work spindle, or even compressed air can be used equally effectively.

Electrical consumers 32, 33 and 34 are interconnected. In particular, the measured values determined by measuring means 33 are sent by infrared transmitter 32 to an external control means which monitors the measurement process.

Other data, for example, information about the charging state of battery 31, can also be transmitted to the external control unit by infrared transmitter 32. This yields the additional possibility of adapting the duration of operation of the generator to the charging state of battery 31 by suitable control of the machine tool. For example, the implement itself can demand charging of the battery by transmitting a corresponding command to the machine tool control via infrared transmitter 32. In this way the service life of the battery can be increased in addition by charging it only when required.

Figure 6:
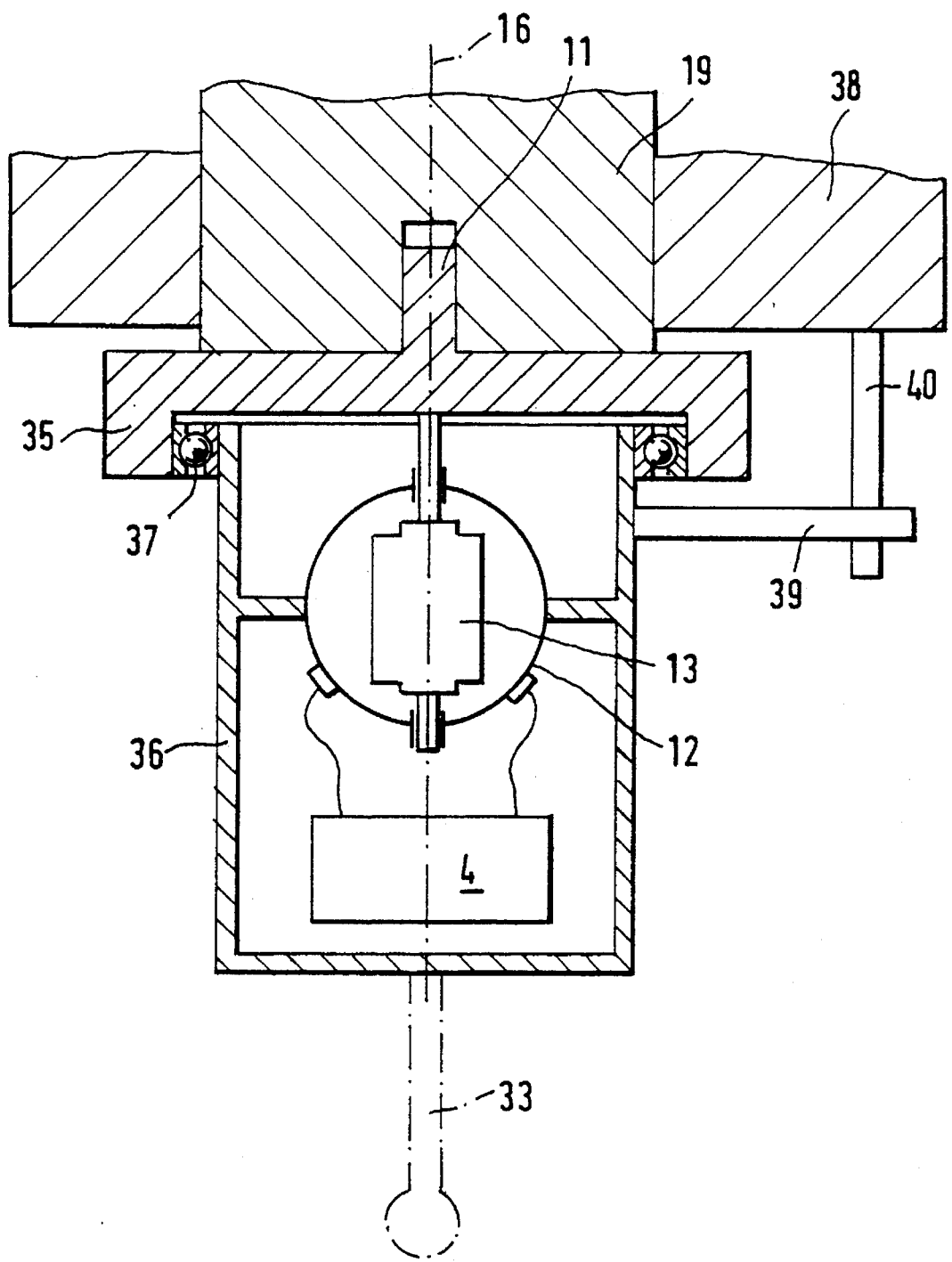
FIG. 6 shows a schematic of an implement which is inserted into the work spindle of a machine tool and which is driven by the rotation of the work spindle.

FIG. 6 shows the schematic of an implement inserted into work spindle 19 of a machine tool, with a generator which is driven by the rotary motion of work spindle 19. The housing of the implement consists of first part 35 which is joined via coupling element 11 to work spindle 19, and of second part 36 on which the working means, here measuring means 33, is located. First housing part 35 is pivotally joined to second housing part 36 such that the axis of rotation coincides with coupling axis 15. Moreover the implement has a generator with rotor 13 joined to first housing part 35 and stator 12 joined to second housing part 36. When two housing parts 35 and 36 are twisted opposite one another, this leads simultaneously to twisting of rotor 13 relative to stator 12 of the generator. Second housing part 36 moreover has stop rod 39 which stands radially to the outside and which lies against stop element 40 of machine head 38. Second housing part 36 therefore cannot twist relative to machine head 38 of the machine tool. If at this point work spindle 19 of the machine tool is caused to rotate, first housing part 35 turns synchronously with work spindle 19, while second housing part 36 is stopped by stop rod 39 and is therefore at rest. In this way rotational energy is transmitted via work spindle 19 to the generator and is converted into electric power by the generator to supply electrical consumer 4. Since the second housing part which has measuring means 33 is at rest, measurements can be easily taken with a contact measuring means. The rotary connection of two housing parts 35, 36 influences the accuracy of attainable measurement results. Therefore bearing 37 which is as precise as possible should be used. FIG. 6 shows simply a schematic.

Figure 7:
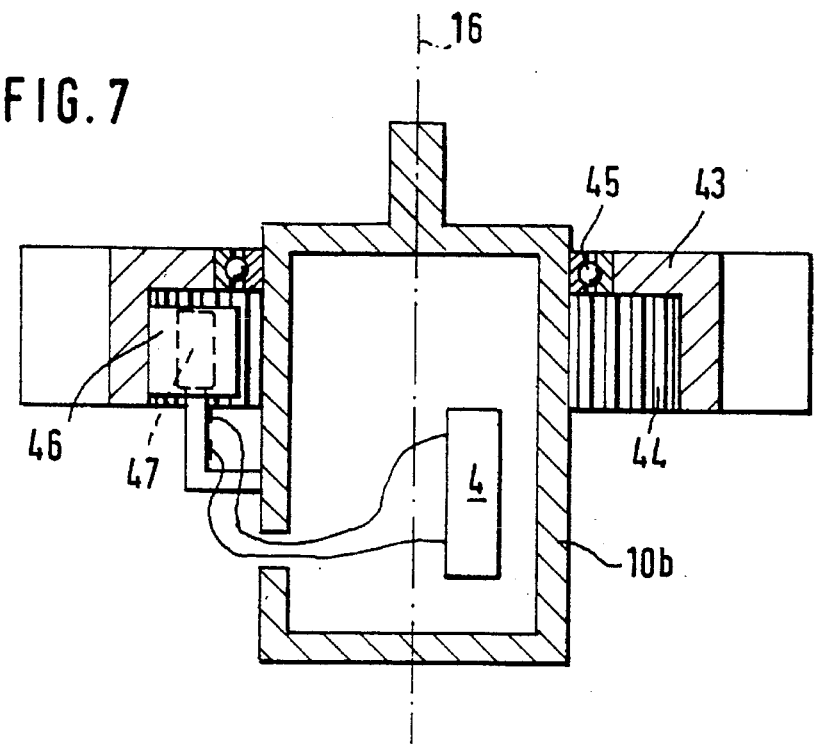
FIG. 7 shows a schematic of an implement with fluid drive located outside the housing and with a generator.

FIG. 7 shows the schematic of an implement with fluid drive located outside the housing and with generator.

Figure 8:
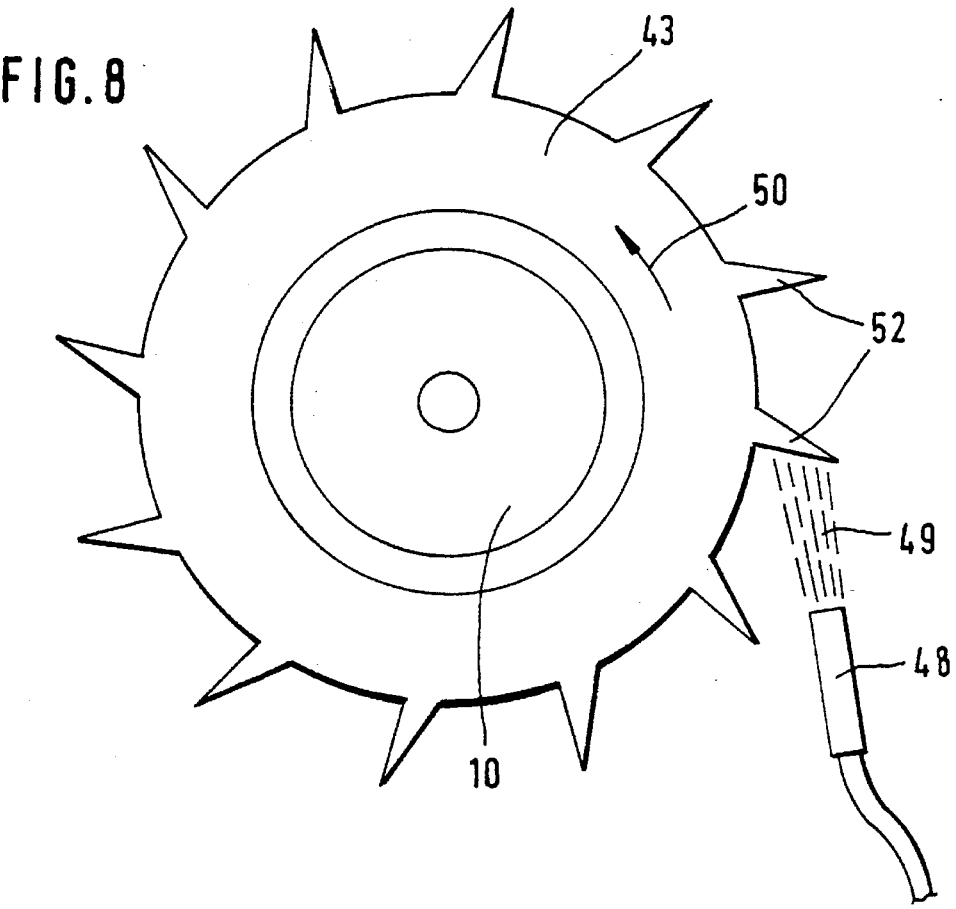
FIG. 8 shows a schematic of the implement shown in FIG. 7 with an external flow source viewed from above.

The same implement is shown in FIG. 8 in an overhead view. The fluid drive shown here is turbine wheel 43 which is connected by ball bearing 45 to housing 10 of the implement. In this example the axis of rotation of turbine wheel 43 coincides with coupling axis 16 of the implement. The generator has rotor 46 and stator 47. It is also located outside of housing 10. It is a generator in which stator 47 is located in the center and rotor 46 is located around the stator and is pivotally connected to it. Turbine wheel 43 on its inside surface has teeth 44 which engage teeth on the outside surface of rotor 46 which are not shown. Rotary motion of turbine wheel 43 is therefore transmitted via teeth 44 to rotor 46. Stator 47 is permanently connected to housing 10 and it has electrical terminals which are connected to electrical consumer 4 located in the housing.

The structure of the turbine wheel which has a host of turbine blades pointed radially to the outside is shown in FIG. 8. Flowing medium 49 from flow source 48 is guided tangentially to turbine wheel 43. There it strikes turbine blades 52 and thus generates a torque acting in the direction of arrow 50 on turbine wheel 43. Preferably compressed air is used as the flowing medium. However it can also be coolant which is supplied to the implement by a coolant hose normally used to cool tools.

The mass of the turbine wheel shown in FIGS. 7 and 8 is used at the same time as a flywheel. The arrangement outside the housing is especially suited for a flywheel. The moment of inertia is large as a result of the large radius of the flywheel.

We claim:

1. A machine tool element comprising:

a housing (10) having a coupling element (11) for connecting the housing to a work spindle (19) of a machine tool, at least one electrical consumer (32, 33, 34), and a generator (2) for generating electric power for said electrical consumer (32, 33, 34), said generator (2) comprising a stator (12) and a rotor (13), the stator (12) being affixed to the housing (10), so that it rotates in unison with the housing, and a flywheel mass (8) mounted for freewheeling rotation within the housing (10), the axis of rotation of the flywheel mass coinciding substantially with the axis of the coupling (16), and an overrunning clutch (17) within the housing for rotationally accelerating the flywheel mass as the housing turns, whereby said flywheel mass is rotated by the overrunning clutch (17) as the housing and stator turn, and continues to turn, driving the rotor so as to generate electricity, after the housing and stator are stopped.

2. An implement according to claim 1, wherein the implement is a measuring head with an integrated transmitting and receiving means for wireless data transmission.

3. An implement according to claim 1, wherein the energy is supplied via the work spindle (19).

4. An implement according to claim 1, wherein the generator (2a) has a stator (12) and a rotor (13), the stator (12) being permanently connected to the housing (10) and further comprising means for converting the supplied energy into rotary motion between the rotor and stator.

5. An implement according to claim 4, wherein said rotor (13) has a flywheel mass or is coupled to a flywheel mass (8) pivotally mounted in housing (10).

6. An implement according to claim 5, wherein the axis of rotation of flywheel mass (8) coincides roughly with a coupling axis (16) so that by means of the rotational acceleration acting on coupling element (11) rotary motion of the flywheel mass (8) relative to the housing (10) can be generated.

7. An implement according to claim 1, wherein the coupling element is a hollow coupling shaft (41) in which the generator (2) is attached such that the rotor axis runs parallel to the coupling axis.

8. An implement according to claim 1, further comprising a battery (31) which is coupled to the implement and which can be charged by the generator to buffer the power supply of consumer (32, 33, 34).

9. An implement according to claim 1, further comprising at least one optical display element (34) for displaying operating data of the generator, on an outside wall of housing (10a).

* * * * *